Nov. 7, 1933.  E. G. RIDER  1,933,566
BOX WRAPPING APPARATUS
Filed Feb. 4, 1930  11 Sheets-Sheet 1

INVENTOR.
ERNEST G. RIDER
BY
Cornelius D. Ehret
ATTORNEY.

Nov. 7, 1933.　　　　E. G. RIDER　　　　1,933,566
BOX WRAPPING APPARATUS
Filed Feb. 4, 1930　　　11 Sheets-Sheet 3

INVENTOR.
ERNEST G. RIDER
BY
Cornelius L. Ehret
ATTORNEY.

Nov. 7, 1933.　　　E. G. RIDER　　　1,933,566
BOX WRAPPING APPARATUS
Filed Feb. 4, 1930　　11 Sheets-Sheet 4

INVENTOR.
ERNEST G. RIDER.
BY
Cornelius D. Ehret
ATTORNEY.

Nov. 7, 1933.     E. G. RIDER     1,933,566
BOX WRAPPING APPARATUS
Filed Feb. 4, 1930     11 Sheets-Sheet 5
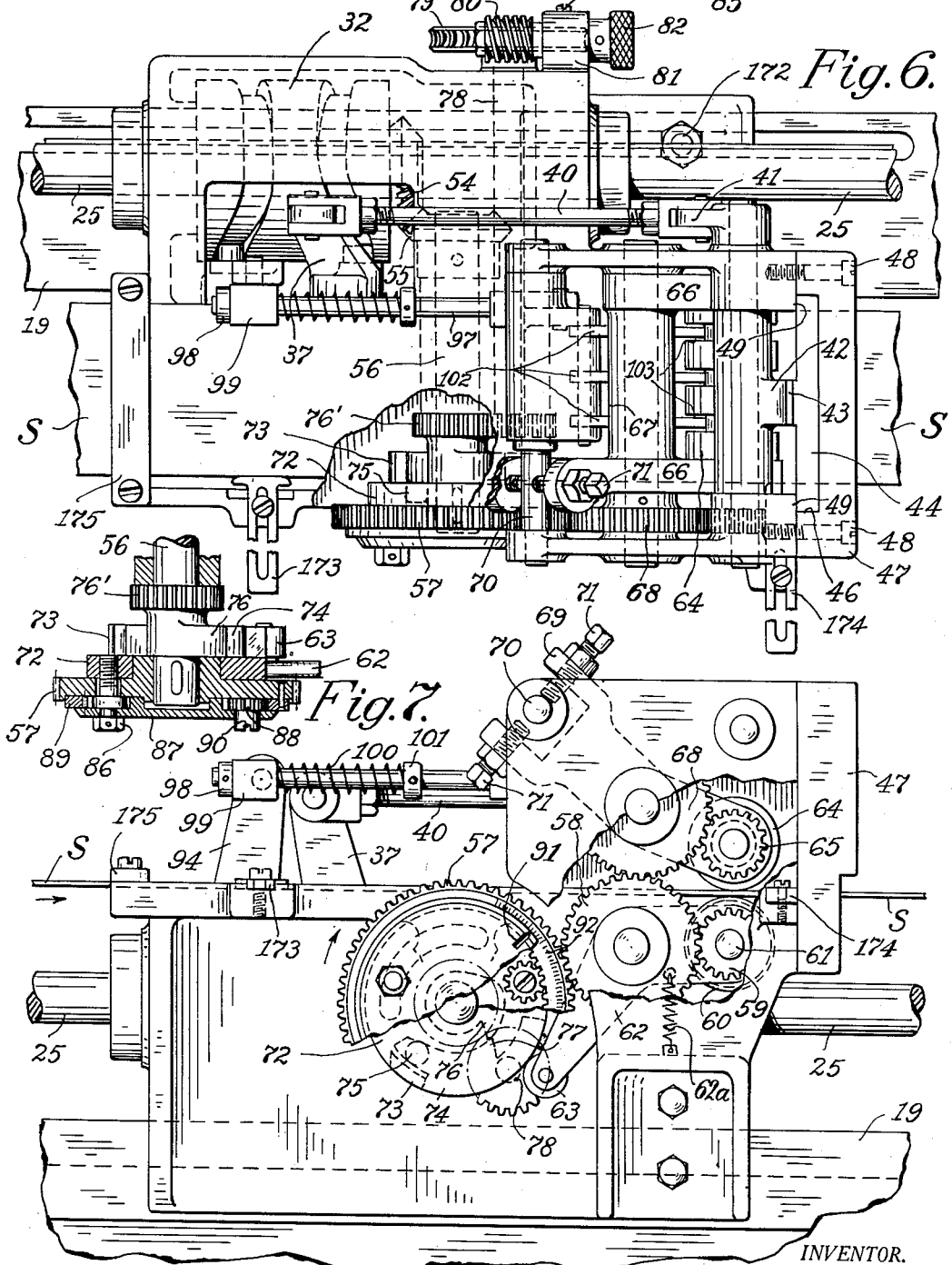
INVENTOR.
ERNEST G. RIDER
BY
ATTORNEY.

Nov. 7, 1933.  E. G. RIDER  1,933,566
BOX WRAPPING APPARATUS
Filed Feb. 4, 1930  11 Sheets-Sheet 6

INVENTOR.
ERNEST G. RIDER
BY
ATTORNEY.

Nov. 7, 1933.                E. G. RIDER                1,933,566
                         BOX WRAPPING APPARATUS
                         Filed Feb. 4, 1930           11 Sheets-Sheet 7
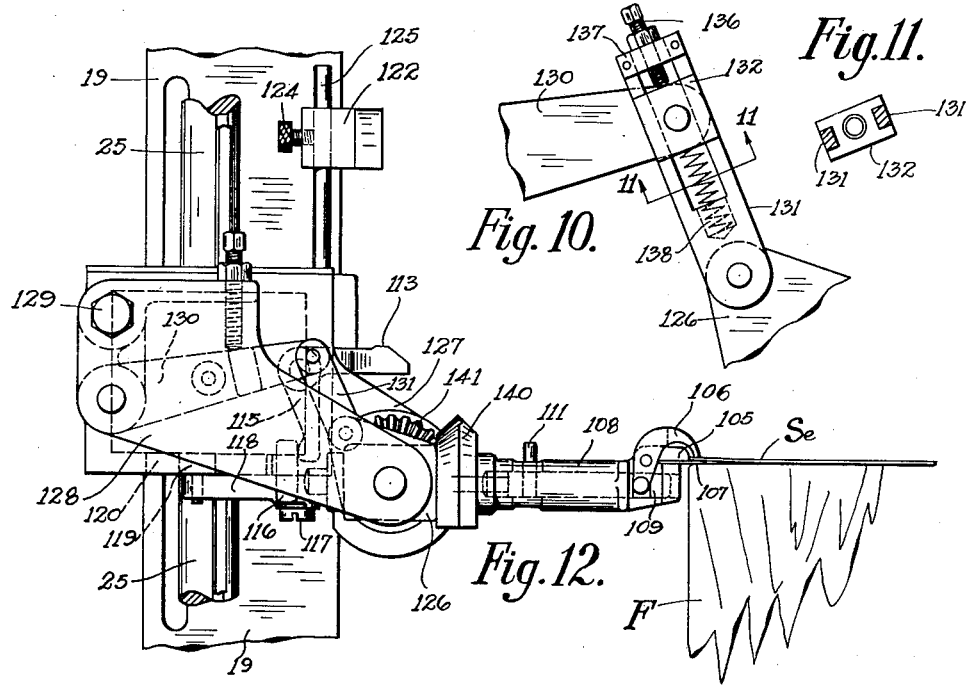
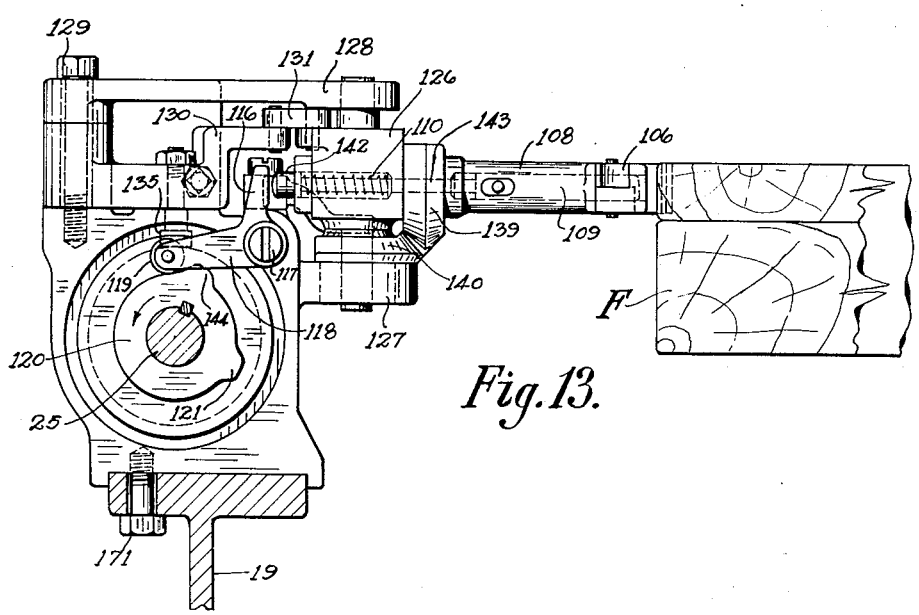
INVENTOR.
ERNEST G. RIDER
BY
Cornelius L. Ehret
ATTORNEY

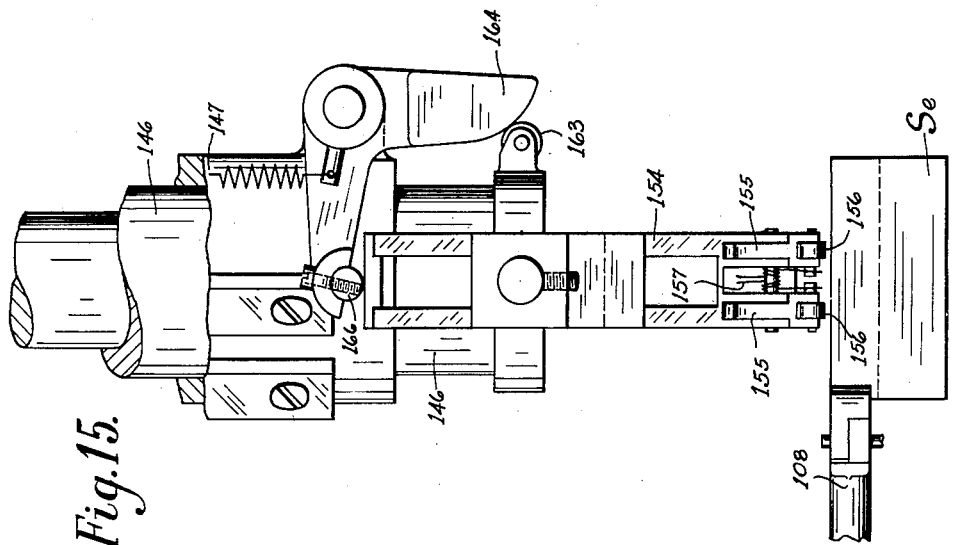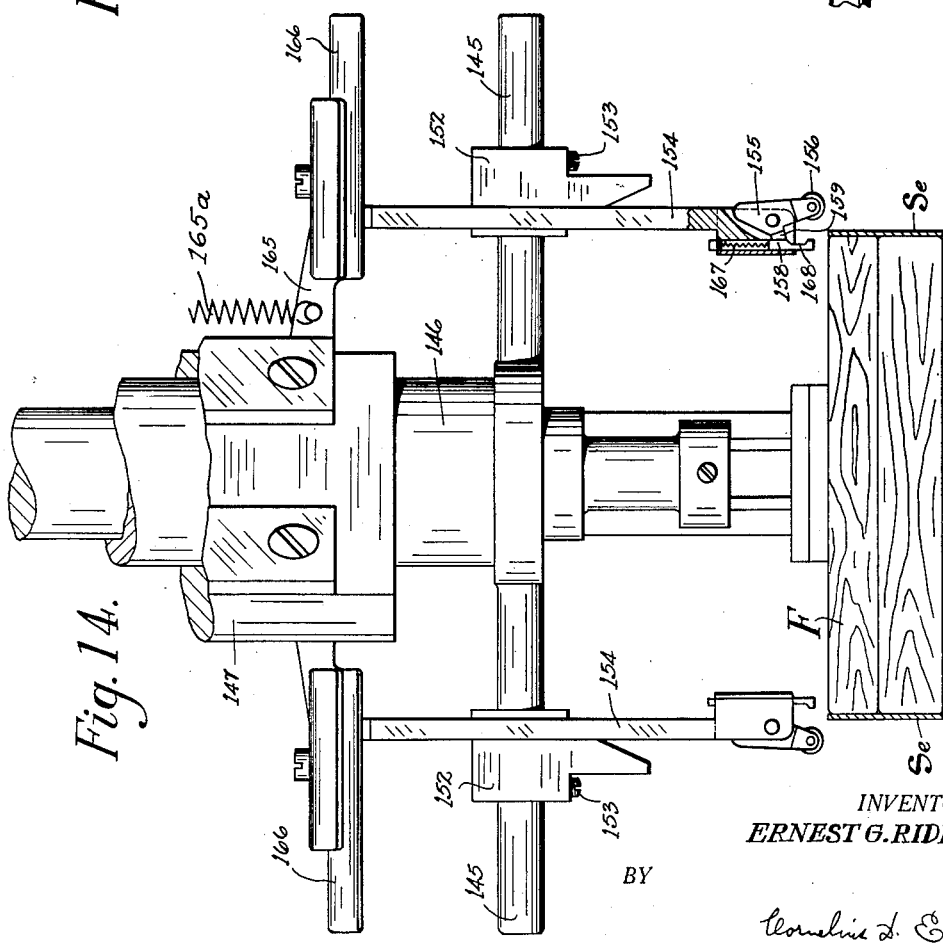

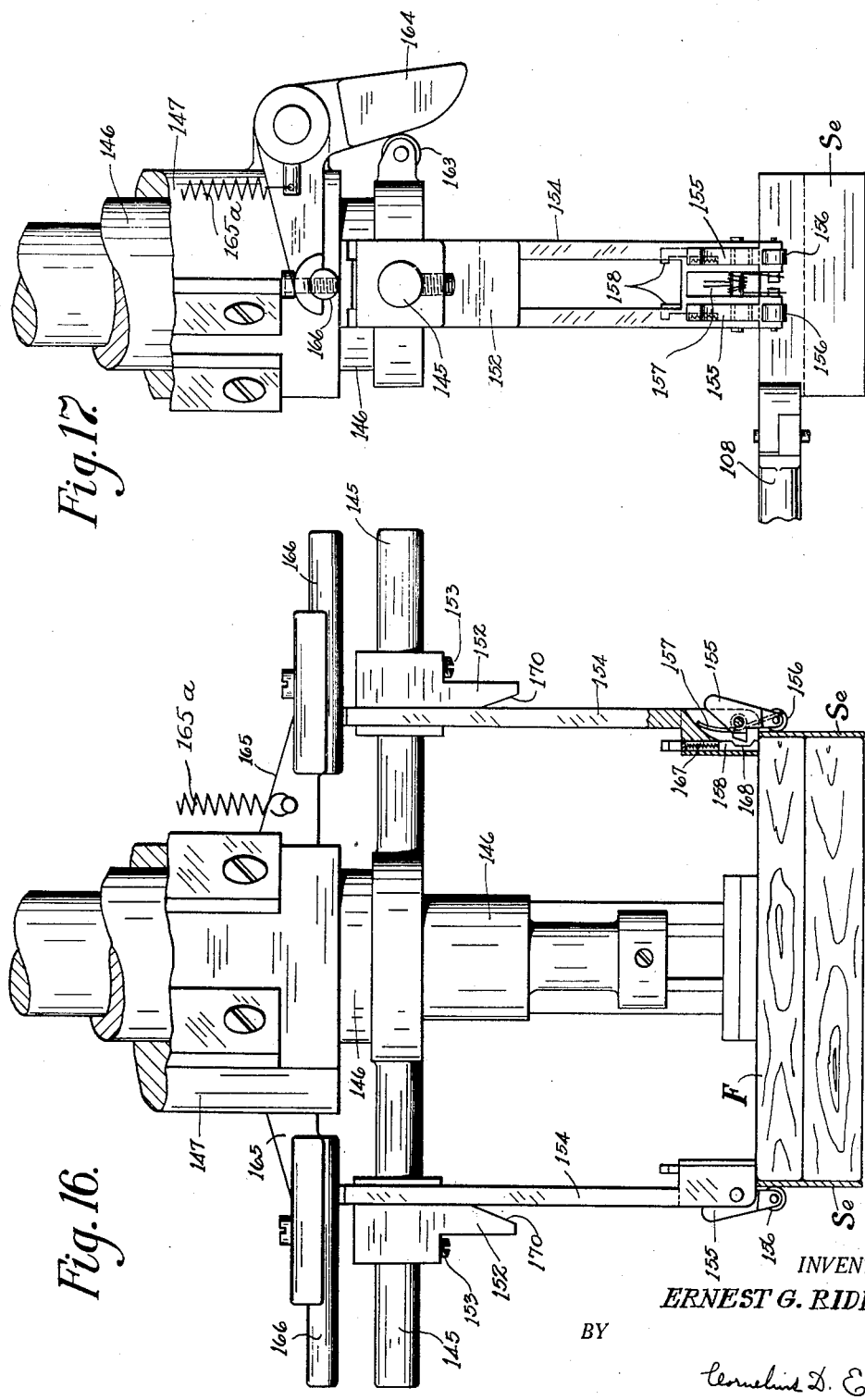

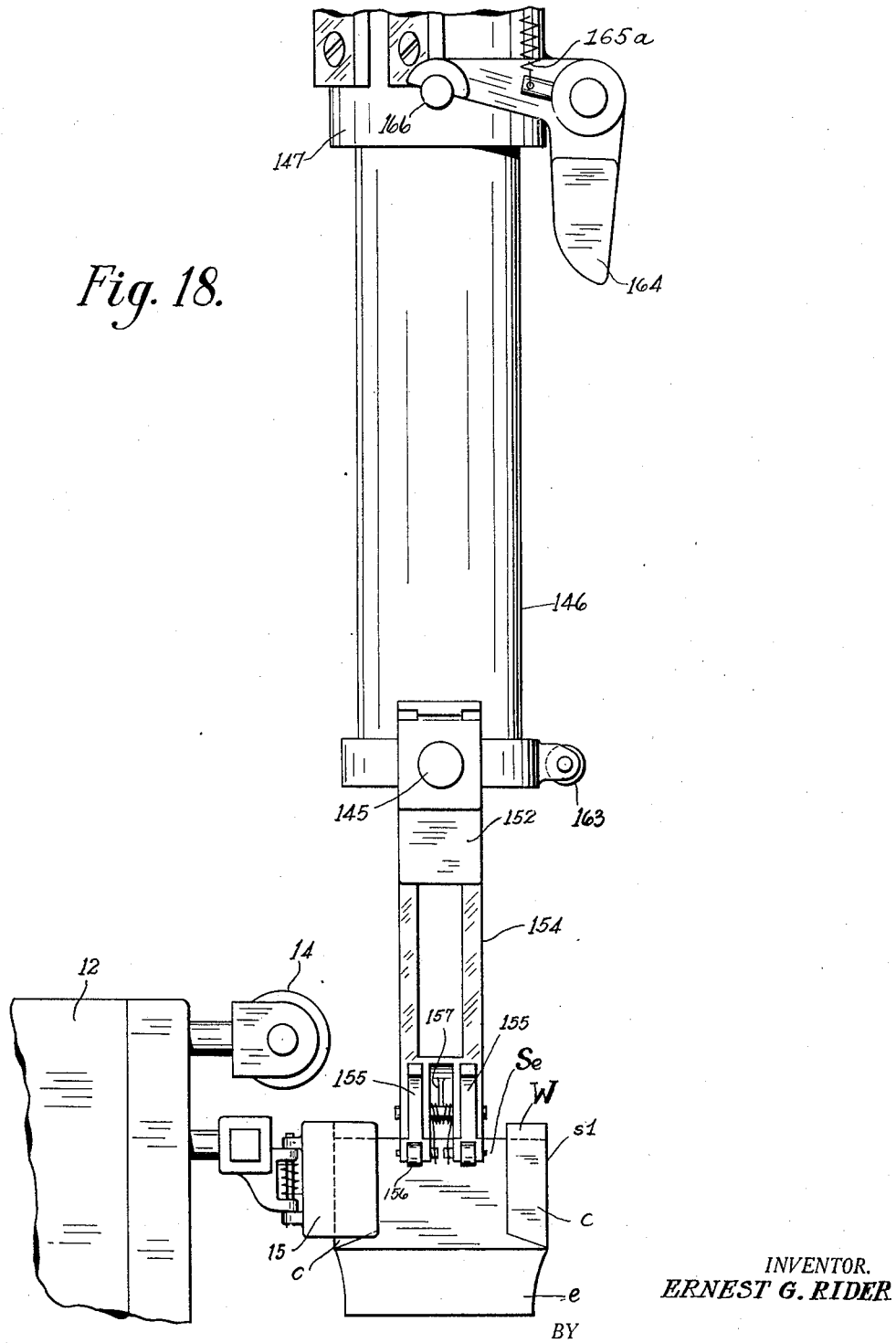

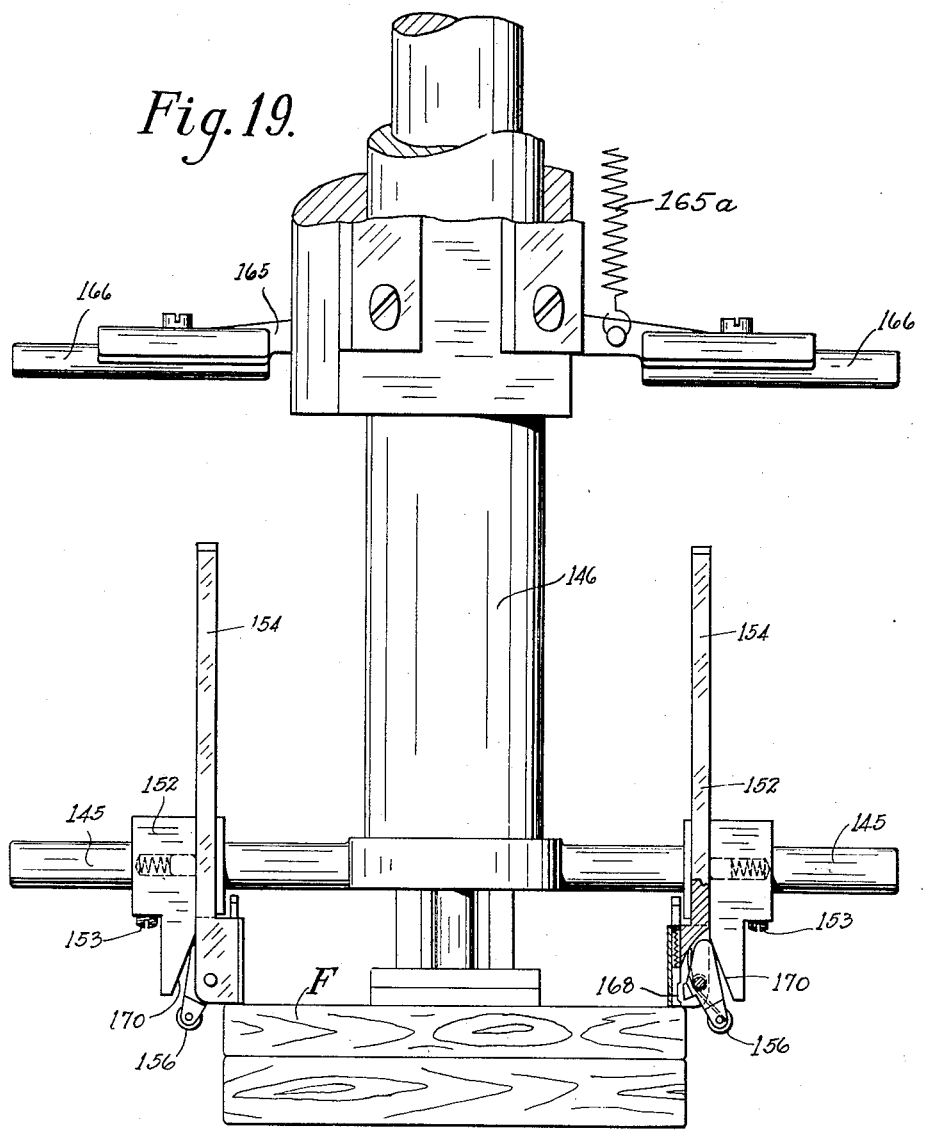

Patented Nov. 7, 1933

1,933,566

UNITED STATES PATENT OFFICE 1,933,566

BOX-WRAPPING APPARATUS

Ernest G. Rider, Philadelphia, Pa., assignor to Stokes & Smith Company, Philadelphia, Pa., a corporation of Pennsylvania Application February 4, 1930. Serial No. 425,751

45 Claims. (Cl. 93—43)

My invention relates to the art of forming boxes, cartons, container structures, or equivalent, hereinafter generically termed "boxes" by applying wrappers, sheets, labels, or equivalent, all hereinafter termed "wrappers" to groups of separate, individual box components, sections or elements of suitable box material.

In accordance with my invention, mechanism operating in timed relation to the form block structure, or equivalent, of a wrapping machine cuts box components from strips of suitable box material and transports them to the form block against which they are held by suitable means during at least a portion of the wrapping operation; more particularly, the strips are fed toward each other, preferably in a substantially horizontal plane, to grippers, or the like, which after a box component is cut from each strip, move the severed components into engagement with vertical faces of the form block, specifically the ends thereof.

Further and more specifically in accordance with my invention, before the transported components are released by the grippers, they are registered with the corresponding faces of the form block, as by holding mechanism associated with the form block.

My invention resides in the features of combination, construction and arrangement hereinafter described and claimed.

For an understanding of my invention and for illustration of one of the forms my apparatus may take, reference is to be had to the accompanying drawings in which.

Figure 1:
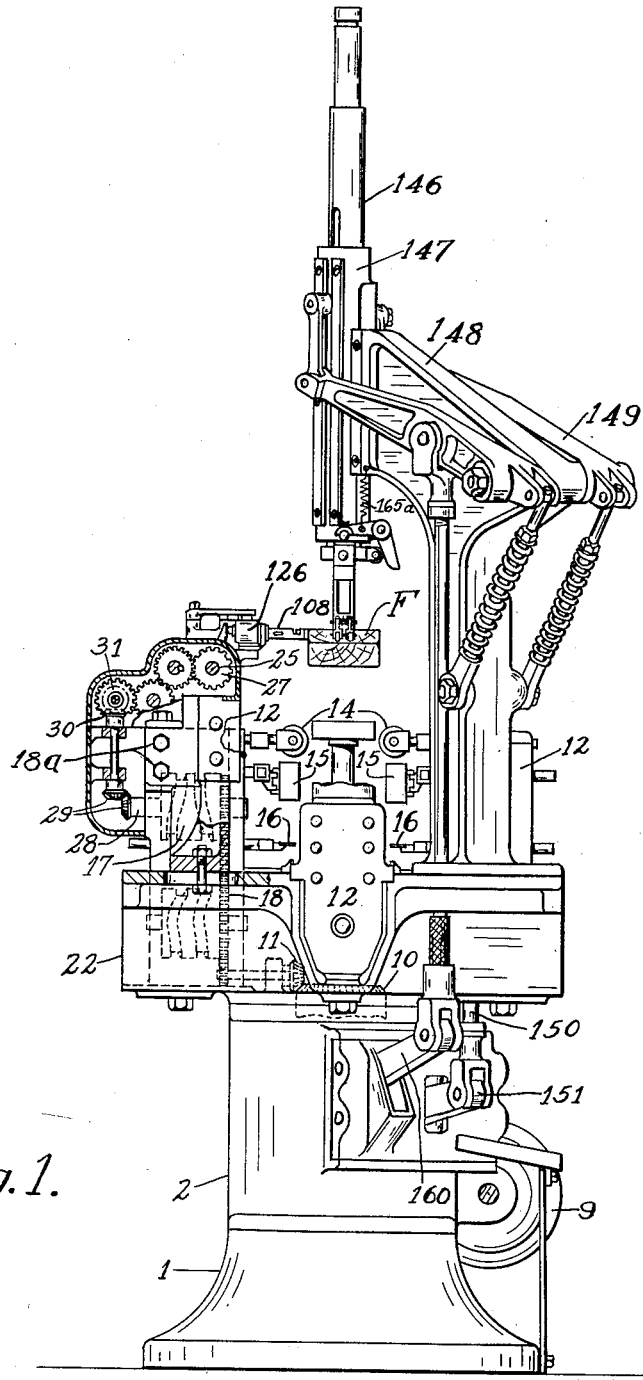
Figure 1 is an end view with parts in section, of a machine for forming and wrapping composite boxes.
Figure 2:
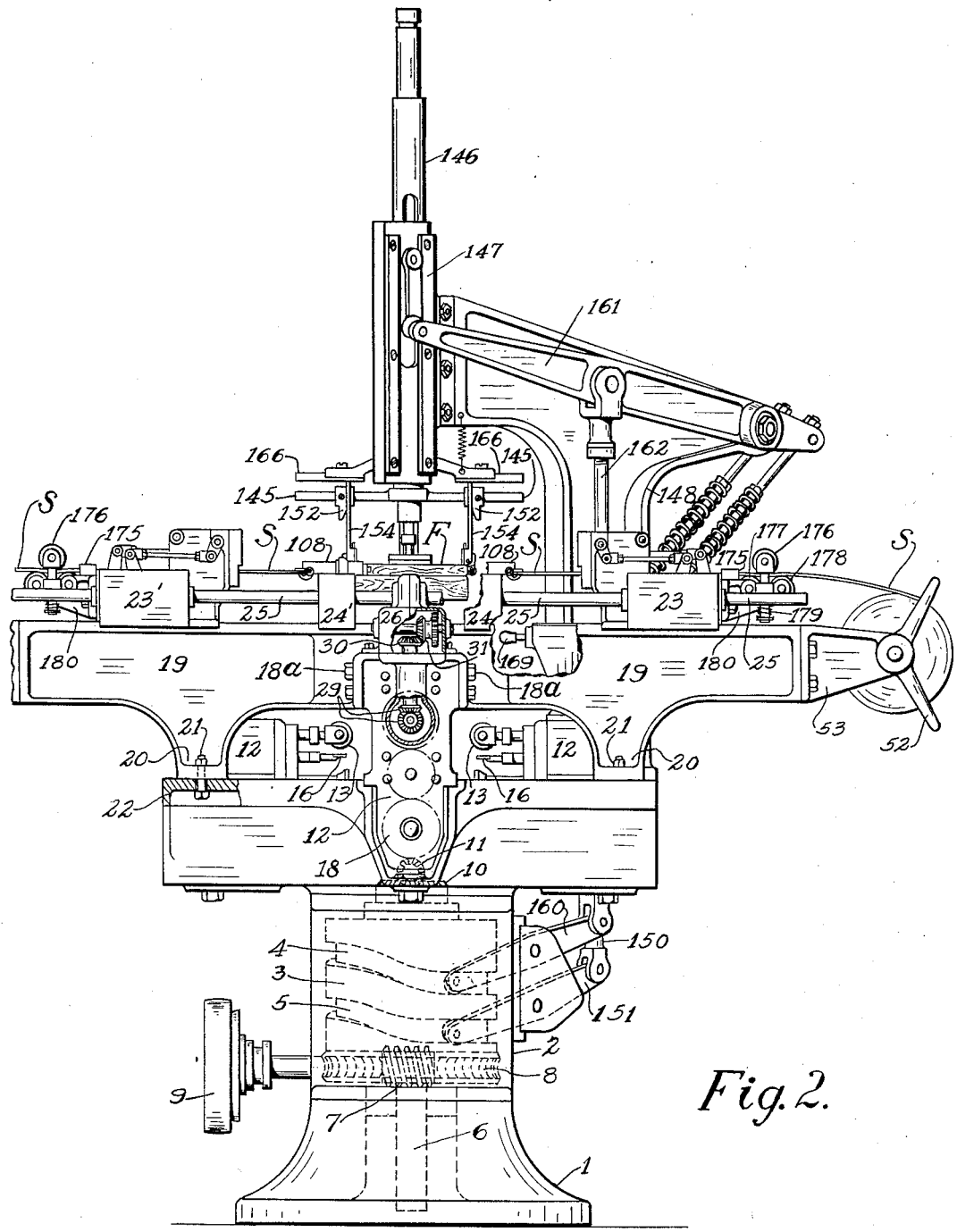
Figure 2 is a rear view of the mechanism of Fig. 1 with parts broken away and omitted for clarity.
Figure 3:
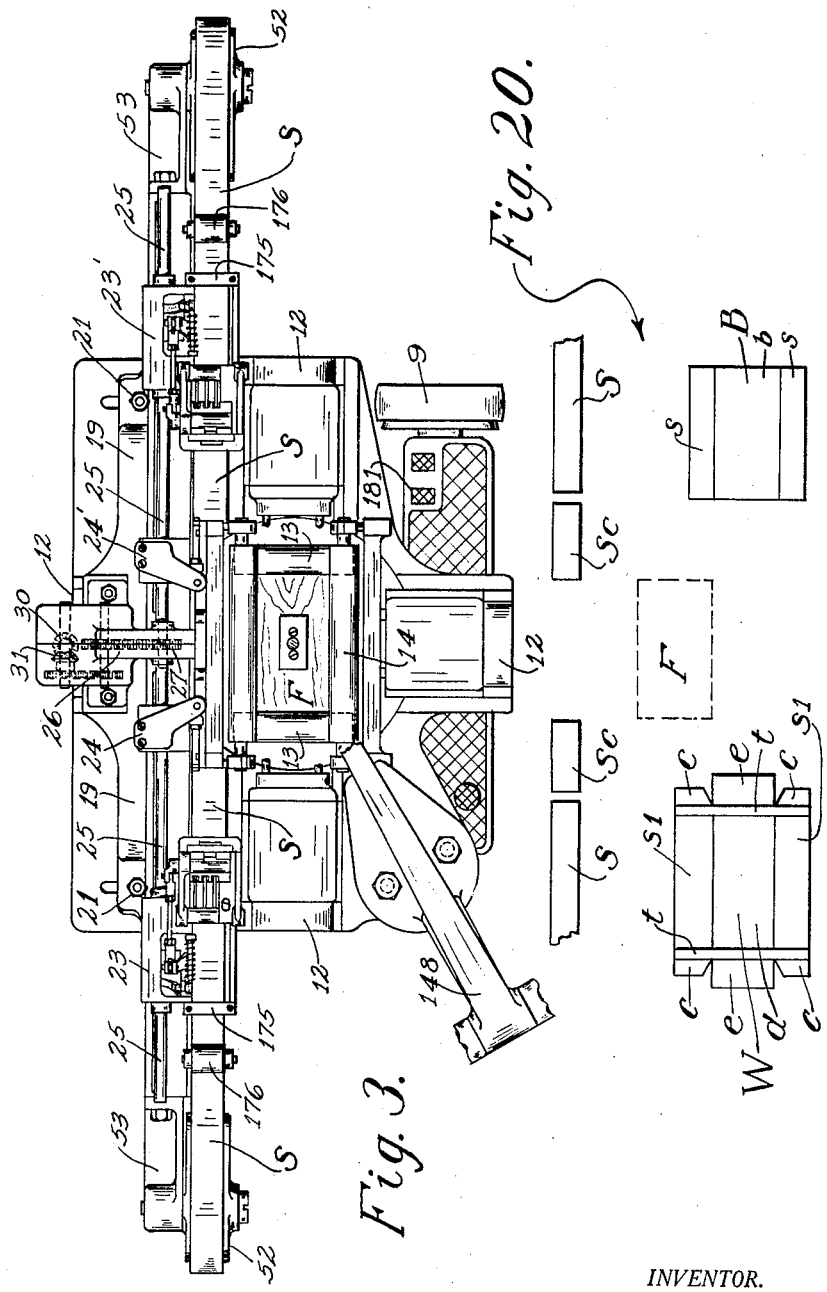
Fig. 3 is a plan view of the mechanism shown in Figs. 1 and 2 with certain parts omitted.
Figure 4:
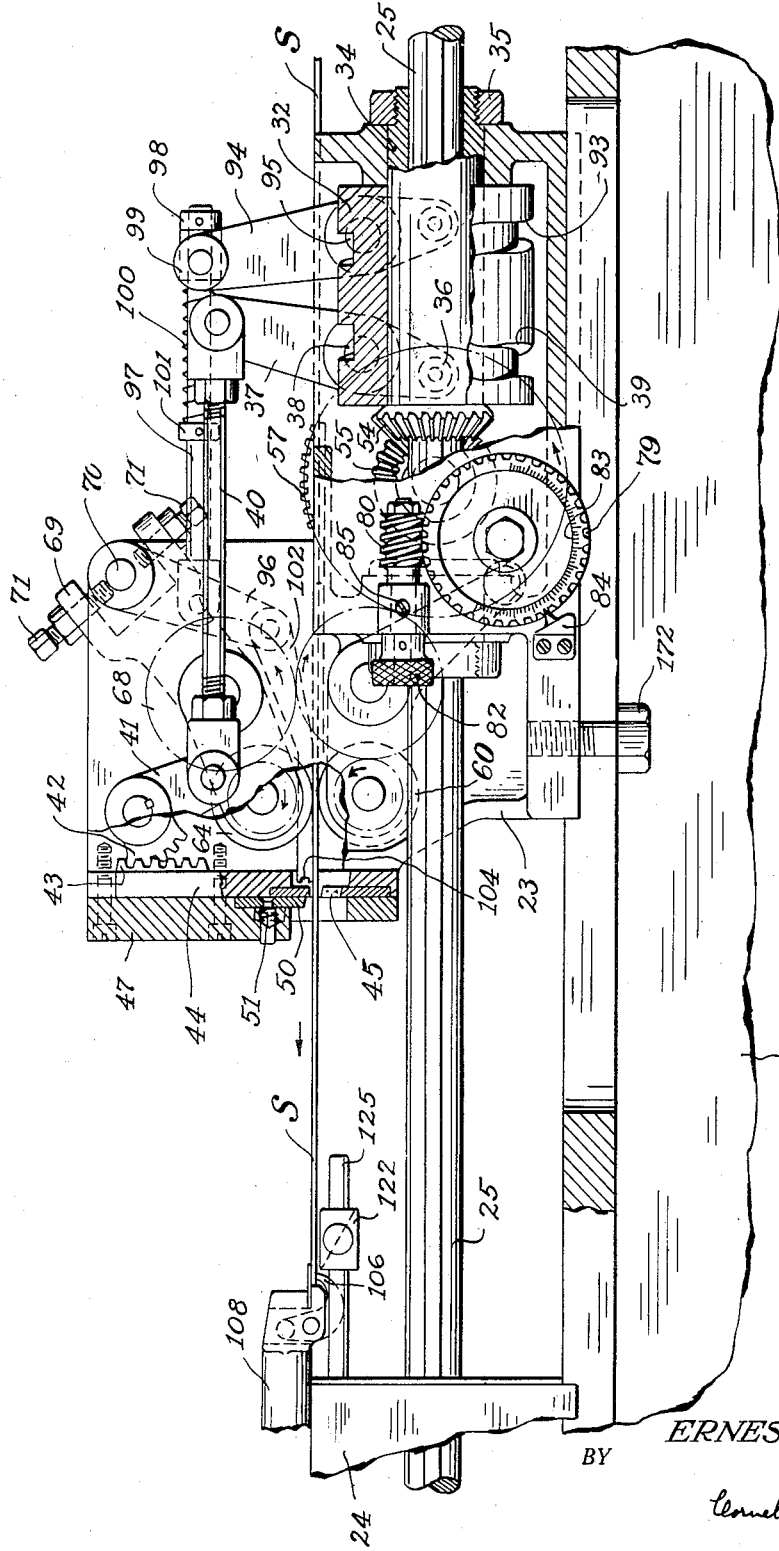

Figs. 4, 5, and 6 are, on an enlarged scale, rear, front, and plan views respectively of strip feeding and cutting mechanism shown in Figs. 1 to 3 inclusive.

Fig. 7 is a detailed view in section of parts disclosed in Figs. 5 and 6.

Figure 8:
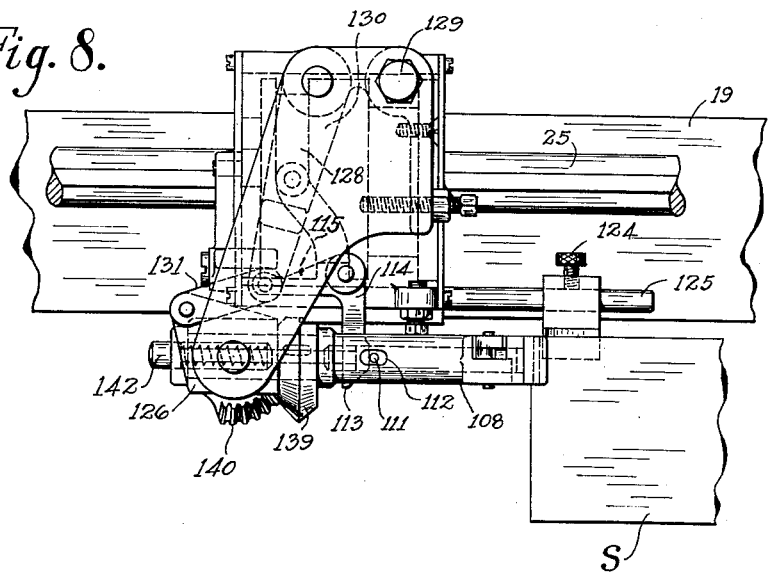
Figure 9:
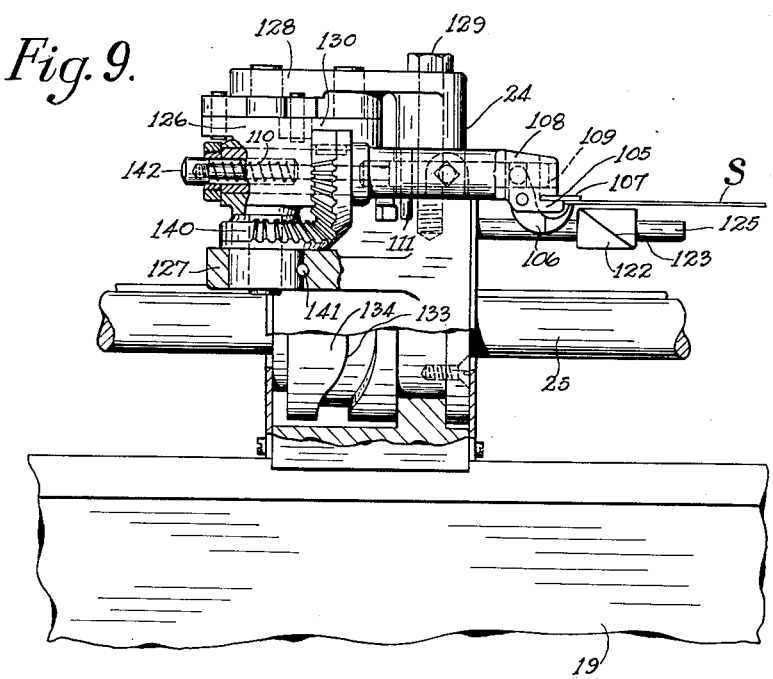

Figs. 8 and 9 are plan and front views respectively of gripping mechanism shown in Figs. 1 to 3.

Fig. 10 is a detail view on enlarged scale of a flexible or expansible link shown in Figs. 8 and 9.

Fig. 11 is a cross-section taken on lines 11—11 of Fig. 10.

Figs. 12 and 13 disclose the gripping and transferring mechanisms of Figs. 8 to 9, with parts in different operating position.

Figs. 14 and 15 are detailed views showing, in rear and side elevation respectively, holding mechanism and form block structure disclosed in Figs. 1 and 2.

Figs. 16 and 17 illustrate the structure shown in Figs. 14 and 15 with parts in different operating position.

Fig. 18 shows the position of mechanism of Figs. 15 and 17 at a subsequent stage of a wrapping operation.

Fig. 19 is similar to Figs. 14 and 16 and illustrates the position of parts at a different part of the wrapping cycle.

Fig. 20 is included for reference in the explanation of the operation of the apparatus of the preceding figures.

Referring particularly to Figs. 1 and 2, upon the pedestal or base 1 is mounted a hollow column 2 which houses the operating cam 3 having cam grooves 4 and 5 for controlling the movement of the main and auxiliary plungers of the form block structure F, as hereinafter described. The cam which is suitably mounted upon a shaft 6 is driven through worm 7 and gear 8 by any suitable source of power suitably connected to the pulley and clutch mechanism 9. At its upper end the shaft 6 is provided with a bevel gear 10 which meshes with the circumferentially spaced bevel gears 11, each of which is associated with the mechanism of one of the slides, units or slide units 12 generally similar to those disclosed in the Federwitz et al. Patent No. 1,541,036. The end folding rolls 13, 13 associated with one pair of units 12, side folding rolls 14, 14, corner lap turn-in fingers 15, 15 associated with the other pair of units 12, and the marginal turn-in fingers 16, 16, are all operated in proper sequence and in timed relation to movement of the form block structure F through mechanisms each including a cam 17 and a gear train 18 driven from a corresponding gear 11. The construction and operation of the mechanism of the slides for effecting the wrapping of a box form per se no part of the present invention and are described in the aforesaid Federwitz patent.

To the rear slide 12, there is attached as by bolts 18a, a bridge 19 preferably having feet 20 adjustably clamped, as by bolts 21 to the table 22, mounted upon the upper end of the column 2. Upon the bridge 19 are adjustably mounted the strip feeding mechanisms 23, 23' and box end gripping and transporting mechanisms 24, 24', Figs. 2 and 3, which are hereafter more specifically described. The operating shaft 25 of these mechanisms is journaled at substantially its central portion, in a housing 26 mounted upon the bridge 19. The gear 27, Figs. 1 and 3, suitably fixed to shaft 25 within housing 26, is driven from the shaft 28 upon which the cam 17 of the rear slide 12 is mounted through a train of gears including mitre gears 29, 29, and bevel gears 30, 31.

Referring to Figs. 4, 5 and 6 the shaft 25 passes freely through the feeding unit 23. As shown most clearly in Fig. 4, cam 32 is mounted within the housing of the feeding unit, upon a hollow hub member 34 slidably keyed to shaft 25 and which passes through the right hand end of the unit Fig. 4. The member 35, threaded upon the hub exteriorly of the unit, serves as a thrust bearing. The cam roller 36 mounted upon one end of lever 37 pivoted at 38 to the frame of the feeding unit engages the cam groove 39. The other end of the lever 37 is connected by the adjustable link 40, to the operating arm 41 of a gear segment 42 meshing with the rack portion 43 of reciprocating knife structure 44 having a blade 45. Reciprocating movement of the knife structure 44 within the groove 46 of the clamping plate 47 held to the main portion of the feeding unit by screws 48, is effected in accordance with and at such times as is determined by the contour of the cam groove 39. The movable knife structure 44 is pressed against bearing faces 49 of the frame of the unit by a fixed knife 50, disposed within groove 46 of retaining member 47, and biased by a compressed spring 51.

A strip S of cardboard, or other suitable box material, is supplied, for example, to the feeding unit from a reel 52 mounted upon a bracket 53, bolted or otherwise secured to the corresponding end of bridge 19.

The strip is fed through the opening or gate of the knife structure by mechanism hereinafter described and at intervals the knife structure is caused to move upwardly to sever the strip by operation of lever 37.

The bevel gear 54 slidably keyed to shaft 25, and preferably integral with hub 34, meshes with bevel gear 55 mounted upon the inner end of a shaft 56 to whose other end is secured gear 57 meshing with gear 58 for driving through gear 59 the lower feed roll 60 of the feeding mechanism. Shaft 61, to which the lower feed roll 60 and gear 59 are secured, is mounted at one end of a bell crank lever 62, pivoted concentrically with gear 58, whose other end is provided with a cam roller 63. The upper feed roll 64 and its driving gear 65 are mounted upon a shaft journaled in arms 66 extending from a connecting member 67 through which extends the shaft of a gear 68 meshing with gears 58 and 65. The supporting structure comprising arms 66 and member 67 is provided with the arm 69 terminating in a U-shaped yoke embracing a fixed stop 70. The limits of movement of the supporting frame for the upper feed roll 64 are determined, by adjustment of the movable threaded stops 71. When there is no strip beneath the upper feed roll, the arm 69 swings downwardly. The position of the arm may be used directly or indirectly to indicate the presence or absence of a strip in the feeding mechanism or to control a supply of strips.

The cam plate 72 which is adjustably held to gear 57 is provided with a projecting fixed cam portion 73 and a cam sector 74 which is pivoted to disk 72 at point 75. The length of the fixed portion 73 corresponds to minimum duration of feed of strip S for producing, as will later appear, end components for the narrowest box the machine is capable of wrapping. Spring 62a forces roller 63 into the path of movement of sector 74. During a predetermined portion of each revolution of cam disk 72, the cam sector 74 is held outwardly, when the box is to greater or less degree wider than the narrowest box which can be wrapped, as indicated in Fig. 5, by an adjustably fixed stop or abutment 76. When the leading edge of the fixed cam portion 73 engages with the roller 63, the lower feed roll 60 is moved upwardly into engagement with the under surface of the cardboard strip S, and this engagement is maintained to effect feeding of the strip S until the tail portion 77 of the cam drops off the high point of the fixed abutment 76. The duration of feed, and therefore the length of strip passing between the rollers for one revolution of gear 57, may be varied by changing the position of stop 76. For that purpose, the stop 76 is freely rotatable upon the shaft of gear 57 and may be, as indicated, integral with a gear 76′ meshing with a gear mounted upon a shaft 78, which extends exteriorly of the feeding unit at the rear thereof and is provided with a worm wheel 79 meshing with a worm 80 mounted upon a short shaft journaled in a projection 81 of the frame of the feeding unit, to whose other end is secured the manually adjustable knob 82 or equivalent. Preferably, and as indicated in Fig. 4, the gear 79 is provided with a scale 83 co-operating with a fixed pointer 84 attached to the frame of the unit, directly to indicate the length of strip fed for each revolution of gear 57, which revolves once for each complete reciprocation of the form block structure F of the wrapping machine. Permanence of adjustment is insured by the locking screw 85 and the provision of worm wheel 70 and worm 80 in the relation indicated.

To change the point in the cycle of operation at which the feeding of the strip S begins, the cam disk 72 is unclamped from gear 57 by slightly loosening the bolt 86 or equivalent. The clamping plate 87 carries a small gear 88 meshing with an internal gear 89 riveted or otherwise suitably secured to the outer face of gear 57. Gear 88 may be revolved by insertion of a suitable tool within slot 90, the index 91 of the clamping plate 87 cooperating with the scale 92 of the ring gear to indicate the extent of angular displacement of the leading edge of the cam 73. Obviously rotation of the gear 88 in such a sense that the cam plate or disk 72 is moved clockwise as viewed in Fig. 5, advances the time of beginning of the strip feeding operation and vice versa.

The second groove 93 of cam 32 receives a roller mounted upon one end of a lever 94 pivoted at 95 whose other end is connected to an arm 96, loosely mounted on stop 70, by a link 97 which passes freely through a block 99 pivoted to the end of lever 94. When the upper end of the arm 94 is moved in clockwise direction the block 99 engages the collar or head 98 of the link 97 and causes positive swing of arm 96 in counter clockwise direction as viewed in Fig. 4. Upon reverse movement of the upper end of the arm 94 as effected by cam groove 93, clockwise motion is imparted to link 97 through the spring 100 whose opposite ends engage respectively the block 99 and a collar 101 secured to link 97. Arm 96 is integral with or secured to a member, to the lower end of which are pivotally secured fingers 102, which normally rest upon the upper surface of the cardboard strip S and reciprocate idly, passing to and fro in the grooves 103 of the upper feed roll 64. The cardboard, particularly when it is cut into long flat strips instead of being fed from a roll, is always cut of such length that there will remain a short piece of cardboard approximately equal to the distance between the knife structure and the feed rolls. The forward end of the fingers 102 which are preferably provided with recesses 104 drop behind the rear edge of the remnant piece or end of the strip and as they move forward force it out of the feeding unit through the opening in the knife structure.

Referring to Figs. 8 to 13, the distance between the feeding unit 23 and transfer unit 24 is such that at the end of the feeding movement, the end of strip S engages a stop 105 of the gripper of the unit 24. The movable gripper jaw 106 which clamps the end of the strip S against a fixed plate 107 is pivotally mounted upon the upper end of the tubular arm 108 in which a rod 109 is slidably mounted. The outer end of the rod 109 is connected to the gripper jaws so that forward movement of the rod opens the gripper and return movement of the rod as effected by spring 110 closes the gripper. Intermediate its ends the rod 109 is provided with a pin 111 which projects through a slot 112 in the tubular supporting member 108. With the parts in the strip receiving position indicated in Figs. 8 and 9, the pin 111 is in the path of movement of an arm 113 of a bell crank lever 114 whose other arm 115 is adjacent or in engagement with the upper end of a second bell crank lever 116, pivoted at 117 and whose arm 118 carries a roller 119 which engages a cam 120 rotatable with shaft 25. The hump 121 of cam 120 through the system of levers described, opens the gripper jaw 106 to receive the advancing end of strip S and upon engagement of the strip with stop 105 substantially immediately closes. At a suitable time after the gripper 106 has closed, the knife structure 44 of the feeding unit is actuated by cam 32 as previously described to sever the strip forming a box component Se which more specifically is adapted to form the end wall of a box.

To guide the advancing end of the strip S into the open gripper jaws, there is provided a deflector member 122 having its upper face 123 inclined upwardly from right to left, Fig. 9. As indicated, the deflector 122 may be adjustably secured as by clamping screw 124 to a rod 125 extending from the body of the transfer unit 24.

The supporting member 108 passes through and is secured to a trunnion block 126 mounted between the lower supporting member 127 projecting outwardly from the body of the transfer unit 24 and an upper plate 128 suitably held in position as by bolt 129. An arm projecting from the upper end of the block is connected to an end of the oscillating arm 130 by an expansible link mechanism most clearly shown in Figs. 10 and 11, and comprising a centrally slotted member 131 which straddles the central portion of a guide block 132 pivoted to the end of arm 130. Movement of arm 130 in counter-clockwise direction as viewed in Fig. 12, and as effected by cooperation between the groove 133 of cam 134 and the cam follower 135, Fig. 13, is communicated to link 131 through the adjustable member 136, Fig. 10, which threadably engages and passes through a bar 137 bridging the open end of link 131. Movement of arm 130 in reverse direction is communicated to link 131 through the spring 138 whose opposite ends engage respectively the block 132 and the bottom of a hole or recess in link 131.

A bevel gear segment 139 secured to the gripper supporting member 108, meshes with a bevel gear segment 140 suitably held as by pin 141 against rotation in the bracket 127 supporting the block 126. As the gripper supporting member 108 is moved from the receiving position shown in Fig. 8 to the delivering position shown in Fig. 12 by arm 130 the engagement between the bevel gear segments 139 and 140 effects rotation of the supporting member about its axis so that the box end Se held by the gripper is moved from a horizontal position, Fig. 8, to a vertical position, Fig. 12. The units 24 and 24' are so adjusted that when the arms or gripper supporting members 108 are at the extreme of their inner travel, the box ends Se cut from the strips S are pressed against and in substantial register with the corresponding faces of the form block F.

When the gripper mechanism is in the position shown in Figs. 12 and 13, the button 142, in which the extension 143 of plunger 109 terminates, is in the path of movement of the arm 116, so that the hump 144 of cam 120 engages the roller 119 to move the plunger 109 against the opposition of spring 110 to effect opening of the gripper jaws. In the meantime by mechanism to be described, the box ends have been engaged by holding mechanism associated with the form block. Before the gripper jaws are reclosed by spring 110, the arm 108 is swung more or less away from the form block structure F towards the position shown in Fig. 8 by arm 130.

Referring to Figs. 14 to 19, the bars 145 are mounted upon or secured to the lower end of the auxiliary plunger 146 which is guided by the cylinder 147 mounted upon the goose-neck standard 148 and operated by the lever 149 which is connected by link 150 to one end of a lever 151 whose other end carries a cam roller engaging the cam groove 5 of the main operating cam 3. The guide blocks 152 adjustably clamped to the rods 145 on opposite sides of plunger 146 by screws 153, or equivalent, are each recessed to receive a reciprocable slide 154 whose lower end carries the pivoted holding fingers 155 preferably having rollers 156 at their lower ends, and biased for rotation in a clockwise direction as viewed in Fig. 14, by springs 157. Each locking pin 158 engages a projection 159 of the corresponding holding finger 155 to prevent its rotation except as hereinafter described.

The parts are in the position indicated in Figs. 14 and 15 when the form block F and the main plunger carrying it, are at the upper end of their travel as effected by cam groove 4 of operating cam 3 through the levers 160, 161 and connecting link 162. The gripper 106 of the units 24 and 24' have brought box ends Se cut from strips S into engagement with the corresponding end faces of the form block structure F. As the auxiliary plunger 146 continues to move upwardly the roller 163 mounted upon its lower end, Figs. 15 and 17, engages the pivoted arm 164 which is connected to or integral with a yoke member 165 pivotally mounted upon and embracing the stationary guiding cylinder 147. Spring 165A insures engagement between arm 164 and its actuating roller 163. The ends of the yoke 165 terminate in elongated adjustable stops 166 which engage the upper ends of the slides 154. The rotation of the yoke member as effected by engagement between roller 163 and 164 forces the slides 154 downwardly, their lower edges squaring or registering the box ends Se with respect to the top edge of the form block structure F insuring a box whose bottom and ends properly meet.

Simultaneously, each locking plunger 158 engages the top of the form block and during continued movement of plunger 146 is moved upwardly in opposition to its biasing spring 167, bringing the recessed portion 168 of the plunger opposite the abutment 159 of the corresponding holding finger which thereupon rotates in clockwise direction as viewed in Fig. 16 under the influence of its biasing spring 157, securely to clamp a registered box end Se against the respective end of the form block. Thereupon the grippers 106 release the box ends Se and return to position for again receiving the forward edges of strips S as previously described.

Subsequently and after a wrapper and another box component forming the bottom and sides of the box have been brought into engagement with the form block F, both the main and auxiliary plungers move to and beyond the side folding rolls 14, 14 which in the usual manner wipe the wrapper side panels s1 into engagement with the box sides. When the form block reaches the position shown in Fig. 13 the turn-in fingers 15 engage the corner laps c of the wrapper W and fold them into engagement with the box ends Se, thus holding the separate box ends Se in their proper position and uniting them with the box sides. The main plunger with the form block and box and wrapper thereon continues to move downwardly to effect the subsequent wrapping operations in the known manner. The auxiliary plunger 146, however, remains stationary at this point and the rollers 156 of the holding fingers ride off the box ends. The folding of the end panels e into engagement with the box ends Se unite them with the box bottom. Upon upward movement of the main plunger, the completed box is stripped from the form block in the usual manner as by stripper bars, not shown, depending from rods 145 and ejected from the machine by the reciprocating kicker rod 169, Fig. 2. As the main plunger continues to move upwardly, it overtakes the auxiliary plunger 146, the upper face of the form block engaging the lower edges of the sliding supports 154 for the end holders 155 and moving them to the position indicated in Fig. 19. The cam faces 170 of the guide blocks 152 engage the upper ends of the holding fingers 155 and push them inwardly against the force exerted by their biasing springs 157. When the form block and main plunger reach the top of their stroke the auxiliary plunger 146 continues to move and the locking plungers 158 are forced by their springs 167 to block rotation of the holding fingers 155, thus holding them in open position to receive another pair of box ends delivered by the gripper mechanism.

In setting up a machine for producing boxes of a certain size, as usual, a form block structure F is selected whose dimensions correspond to the inside dimensions of the box to be made. Then as heretofore, the several slide units 12 are adjusted so that the several wrapping instrumentalities carried thereby will properly function during the wrapping operation. Since the bridge 19 is carried by the rear slide 12 the adjustment of this slide at the same time moves the reels 52, strip feeding units 23, 23' and transfer mechanisms 24, 24'. The bolts 171, Fig. 13, holding the transfer units to the bridge 19 are loosened and the units slid toward or away from one another until the gripper jaw 106 when swung inwardly assumes the position shown in Figure 12. The bolts 171 which pass through the slot in the bridge are then tightened, securely to clamp the units in the adjusted position. If desired rack and pinion or equivalent mechanism can be used for effecting the adjustment. The guides 152 for the end holder slides 154 are adjusted along bars 145 to proper position. Each of the feeding units 23 and 23' is adjusted by loosening bolts 172, Fig. 4 and sliding it on bridge 19 until the distance between its knife structure and the stop 105 of the corresponding gripper when in its "out" position, Fig. 8, is substantially equal to the width of the box to be made. The guides 173 and 174 of each feeding unit, Fig. 6, are adjusted to hold the cardboard strip S of width corresponding to the depth of the box against a rear guiding surface of the feeding unit, the plate or strap 175 holding the strip S flat against the upper surface of the feeding unit. Particularly when the strip is fed from a reel as indicated, it is preferable to flatten it as it comes from the roll and before it enters the feeding mechanism. As indicated in Fig. 2 this may be accomplished by the three rolls 176, 177 and 178, the first of which is biased by a spring 179 downwardly toward engagement with the other two rolls, the strip passing between the upper and lower rolls. As indicated, this straightening mechanism may be mounted upon a bracket 180 attached to the feeding unit.

During the operation of the machine the strips S, S are fed toward each other in a horizontal plane, and during a pause in the feeding operation and when the grippers have closed upon the ends of the strips the knives 45 cut the strips to form the end components Se which are swung inwardly by the respective transfer mechanisms 24, 24' into engagement with the ends of the form block as previously described. The operator sitting at the front of the machine may take a main box component B, Fig. 20, having the bottom section b, and side panel sections s, s and place it upon a coated wrapper W, preferably having tabs t, t thereon, the bottom panel b of the box component registering with the central panel d of the wrapper. The box component B with the wrapper W adhering thereto is then held against the upper form block structure F. The treadle 181 is then depressed, to operate clutch 9 and the upper form block descends to hold the component B and wrapper W between the upper and lower form blocks. The wrapping machine performs its usual cycle of operation and the box formed from the several components Se, Se and B is wrapped and ejected from the machine. When the upper form block F at the end of its cycle reaches its upper position, a second pair of box ends have been cut from the strips S and delivered to it as previously described. A second box blank and wrapper are held against the form block and the operation repeated.

The box components B and tabbed wrapper W from a gluing unit, may be automatically delivered into the path of the reciprocating form block structure by conveyor mechanism operating in timed relation thereto as disclosed in co-pending Stokes application, Serial No. 147,405, filed November 10, 1926. When the wrappers W and components B are fed manually, it is desirable that the wrappers W be freshly prepared, and to that end they may be delivered to the operator by a wrapper gluing and tabbing mechanism of the character described and claimed in my co-pending application Serial No. 294,436, filed July 21, 1928.

The apparatus disclosed is an improvement upon that disclosed and claimed in the aforesaid Stokes application and effects automatically the methods described and claimed in co-pending Stokes application Serial No. 363,828, filed May 17, 1929.

What I claim is:

1. Box-forming apparatus comprising form-block structure, means for delivering separate components of a box to said form-block structure, mechanism movable with respect to said form-block structure for aligning said components with respect to corresponding faces of said structure, and mechanism associated with said form block structure to apply sheet material to said aligned components to hold them in position to form a box.

2. Box-forming apparatus comprising intermittently movable form-block structure, means for delivering box components to said form-block structure when stationary, and mechanism movable with respect to said form-block structure when said form-block structure is at rest for aligning said box components with corresponding faces of said form-block structure.

3. Box-forming apparatus comprising vertically reciprocable form-block structure, and transfer mechanism adapted to receive horizontally disposed box components and to bring them into face to face engagement with vertical sides of said form-block structure.

4. A wrapping machine comprising a main plunger and an auxiliary plunger, form-block structure carried by said main plunger, grippers carried by said auxiliary plunger for holding box components against said form-block structure for a portion of a box wrapping operation, means for delivering said components to said form block structure, and means for moving said grippers out of the path of delivery of said components.

5. Box-forming apparatus comprising form-block structure, mechanism for cutting components of a box from strip-like box material, and means for delivering the box components from said mechanism to said form-block structure.

6. Box-forming apparatus comprising movable form-block structure, mechanism operating in timed relation to said structure for severing components of a box from striplike box material, and means operating in timed relation to said structure and said mechanism to transport said box components from said mechanism to said form-block structure.

7. Box-forming apparatus comprising vertically reciprocable form-block structure, means for feeding strip-like box material in a horizontal plane, mechanism for cutting box components from said material, and means for delivering said components in face to face engagement with vertical sides of said form-block structure.

8. Box-forming apparatus comprising movable form-block structure, a unit for feeding strip-like box material and cutting box-components therefrom, a second unit for receiving said box components from said first unit and bringing them into position against said form-block structure, and mechanism effecting operation of said units in timed relation to said form-block structure.

9. Box-forming apparatus comprising movable form-block structure, a unit for feeding striplike box material and cutting box components therefrom, a second unit for receiving said components from said first unit and bringing them into position against said form-block structure, a common support for said units adjustable simultaneously to move them in one direction toward or away from the path of movement of said form-block structure, and means permitting individual adjustment of said units in another direction toward or away from each other.

10. Box-forming apparatus comprising a form-block structure, mechanism for cutting box components from a strip of box material and bringing them in succession against one side of said form-block structure, and mechanism for cutting box components from a second strip of box material and bring them in succession against another side of said form-block structure.

11. Box-forming apparatus comprising form-block structure, mechanisms on opposite sides of said structure for feeding strips of box material, means for cutting said strips into pairs of box components, and means adjacent said form-block structure for bringing the pairs of box components in succession against the corresponding faces of said form-block structure.

12. Box-forming apparatus comprising vertically reciprocable form-block structure, mechanisms on opposite sides of said structure for feeding strips of box material toward said form-block structure in a horizontal plane, means for substantially simultaneously cutting the ends of said strips to form a pair of box components, and means adjacent said form-block structure for bringing the pairs of box components in succession against vertical faces of said form-block structure including mechanism for swinging said components from horizontal to upright position.

13. Box-forming apparatus comprising movable form-block structure, a mounting for striplike box material, mechanism for feeding said material and cutting box components therefrom, mechanism for transporting said box components to said form-block structure, and a common support for said mounting and said mechanism adjustable simultaneously to move them toward or away from the path of movement of said form-block structure.

14. Box-forming apparatus comprising movable form-block structure, groups of mechanisms on opposite sides of said form-block structure for feeding striplike box material, cutting box components therefrom and transferring the box components to said form-block structure, each group comprising a transfer unit and a cutting unit, a common support for said groups adjustable simultaneously to move them toward or away from the path of movement of said form-block structure in one direction, and means permitting adjustment of the individual units of said groups toward or away from each other in another direction.

15. Box-forming apparatus comprising movable form-block structure, a slide carrying box-wrapping instrumentalities cooperating with said form-block structure, and mechanism for delivering box components to said form-block structure mounted upon said slide and adjustable therewith toward and away from said form block structure.

16. Box-forming apparatus comprising movable form-block structure, a slide carrying box-wrapping instrumentalities cooperating with said form-block structure, and mechanism for cutting box components from striplike box material and transferring them to said form-block structure mounted upon said slide and adjustable therewith for different sizes of boxes.

17. Box-forming apparatus comprising movable form-block structure, a slide carrying box-wrapping instrumentalities cooperating with said form-block structure, a support for striplike box material mounted upon said slide, and mechanism for feeding said material, cutting box components therefrom, and delivering the box components to said form-block structure supported by and adjustable with said slide.

18. In combination with a machine for applying wrappers to boxes and having form-block structure, mechanism for cutting box components from box material and delivering them to said form-block structure, and means associated with said form-block structure for holding said components against said form-block structure at least until said components are engaged by a wrapper portion.

19. In combination with a machine having intermittently movable form-block structure, gripper mechanism movable to bring box components against said form block structure, and means actuated when said form block structure and gripper mechanism are at rest to clamp said box components against said form block structure.

20. Box-forming apparatus comprising transfer mechanism, means for feeding a strip of box material to said transfer mechanism, knife structure actuated when the end of said strip is received by said transfer mechanism to cut a box component therefrom, form-block structure, and means for operating said transfer mechanism to bring said box-component to said form-block structure.

21. Box-forming apparatus comprising transfer mechanism including a gripper, means for feeding a strip of box material to said gripper, knife structure actuated when said gripper is closed upon said strip for cutting a box component therefrom, form-block structure, and means for moving said gripper to bring the box component held thereby against said form-block structure.

22. Box-forming apparatus comprising transfer mechanism including a gripper, means for feeding a horizontal strip of box material to said gripper, knife structure actuated when said gripper is closed upon said strip for cutting a box component therefrom, form-block structure, and means for rotating said gripper to bring the box component held thereby against a vertical side of said form-block structure.

23. Box-forming apparatus comprising form-block structure, transfer mechanism including a gripper adjacent the path of movement of said form-block structure, means for feeding a horizontal strip of box material to said gripper, knife structure for severing the end of said strip to form a box component, and means for rotating said gripper about two axes to bring the box component held thereby against a vertical side of said form-block structure.

24. Box-forming apparatus comprising transfer mechanism including a stop and a gripper, means for feeding a strip of box material to said transfer mechanism, knife structure actuated while the end of said strip engages said stop to cut a box component from said strip, form-block structure, and means for closing the gripper and moving it while closed upon said box component to bring said component against said form-block structure.

25. Box-forming apparatus comprising form-block structure, transfer mechanism, means for feeding a strip of box material to said transfer mechanism, knife structure disposed between said feeding means and transfer mechanism for cutting box components from said strip, said transfer mechanism delivering the box components to said form-block structure.

26. Box-forming apparatus comprising form-block structure, a pair of transfer mechanisms disposed on opposite sides of said form-block structure, a pair of mechanisms for feeding strips of box material to said transfer mechanisms, and a pair of knife structures each disposed between one of said transfer mechanisms and its associated feeding mechanism for cutting box components from said strips, said transfer mechanisms substantially simultaneously bringing a pair of box components against corresponding faces of said form-block structure.

27. Box-forming apparatus comprising form-block structure, a pair of similar transfer mechanisms equally spaced from said structure and disposed on opposite sides thereof, a pair of knife structures each disposed at a distance from its associated transfer mechanism dependent upon the width of said form-block structure, and means for feeding strips of box material to said transfer mechanisms in paths intercepting the paths of movement of said knife structures.

28. Transfer mechanism comprising a pivoted arm, gripper structure mounted thereon, mechanism for actuating said gripper structure, and means for effecting pivotal movement of said arm and rotation of said gripper structure with respect to said arm.

29. Transfer mechanism comprising a movable arm, gripper structure mounted thereon, a bar carried by said arm and movable with respect thereto for actuating said gripper, spaced abutments on said bar, and gripper operating means alternately engaging said abutments for different positions of said arm.

30. Transfer mechanism comprising a pivoted member, a bar rotatably mounted thereon, gripper structure and actuating mechanism therefor carried by said bar, a gear secured to said bar, a second gear in mesh with said first gear locked to prevent rotation, and means effecting movement of said member and thereby rotating said gripper structure.

31. A transfer unit comprising a cam and cam follower, a pivoted member connected to said cam follower, a bar rotatably mounted on said member, gripper structure and actuating mechanism therefor carried by said bar, and means effecting relative rotation of said bar and said member upon pivotal movement of said member.

32. A transfer unit comprising a pivoted arm, gripper structure mounted thereon, cam structure for effecting movement of said arm and gripper structure from a receiving position to a delivering position, and cam structure effecting operation of said gripper structure at said positions.

33. Box-forming apparatus comprising form block structure, a strip feeding unit comprising feed rolls, a pivoted frame for one of said rolls, a rotatable cam operating in timed relation to said form block structure for effecting movement of said frame to determine the duration of feed, a supporting member for said unit, and means permitting adjustment of said unit with respect to said member.

34. A box-forming machine comprising form block structure, a strip feeding unit comprising feed rolls, a pivoted frame for one of said rolls, a driving member for said rolls, a cam operating in timed relation to said form block structure for effecting movement of said frame mounted upon said member, and means permitting adjustment of said cam with respect to said member for determining the point of beginning of feed by said rolls in the cycle of operation of said form block structure.

35. A box-forming machine comprising form block structure, a strip feeding unit comprising feed rolls, a pivoted frame for one of said rolls, a driving member therefor, a cam controlling movement of said frame, mounted upon said member and operating in timed relation to said form block structure, means for varying the effective length of said cam to determine the duration of strip feed, and means permitting adjustment of said cam with respect to said member to determine the point of beginning of strip feed.

36. A box-forming machine comprising form block structure, a strip feeding and cutting unit comprising feed rolls, a drive shaft rotating in timed relation to said form block structure, a gear train connecting said rolls to said drive shaft, knife structure, a cam rotatable with said shaft, and a lever system connecting said knife structure and said cam.

37. A box-forming machine comprising form block structure, feeding and cutting mechanism comprising feed roll for feeding strips, knife structure adjacent said feed rolls and operating in timed relation to said form-block structure to cut said strips into pieces of predetermined length, and means for ejecting remnant pieces of said strips between said rolls from said mechanism.

38. A box-forming machine comprising form block structure, a strip feeding mechanism comprising feed rolls, pivoted frames for each of said rolls, and a rotatable cam operating in timed relation to said form block structure for effecting relative movement of said frames to determine the duration of strip feed.

39. A box-forming system comprising form block structure, sheet-applying means associated therewith to form composite boxes, mechanism for cutting components of a box from strips of box material during each box-forming cycle, and means for receiving said components and delivering them to said form block structure at the beginning of a subsequent cycle.

40. A system for forming composite boxes comprising a movable form block, sheet-folding tools movable toward and away from the path of said form block, means for feeding strips of box material adjacent to said form block, mechanism for cutting said strips to form, for each cycle, components of a box, means for delivering the components to the form block at the beginning of the cycle, and a common source of power for driving said form block, said tools, said strip-feeding means, said cutting mechanism and said delivering means.

41. A wrapping machine comprising movable form block structure, means adjacent the path of movement of said structure for folding sheet-material, mechanism for delivering components of a box to said structure, and members movable to register said components with said form-block and to hold said registered components thereagainst for movement with said form-block toward said sheet-folding means.

42. A wrapping machine comprising a movable form block, sheet-folding means adjacent the path of movement of said form block, mechanism for delivering components of a box to the form block, and members movable to register the components, while held by said mechanism, with the form block and to hold the registered components against the form block after release by said delivering mechanism and during movement of the form block and registered components toward said sheet folding means.

43. A box machine comprising a form block, sheet-folding means associated therewith, means for cutting components of a box for each box-forming cycle of the machine, mechanism for delivering components of a box to said form block at the beginning of each cycle, and members movable to register the delivered components with the form block and to hold them in registered position for part of the box-forming cycle.

44. A box machine comprising a movable form block, sheet-folding means associated therewith to unite box components upon said form block by sheet material, means operative during the box-forming cycle for feeding strips of box material and cutting components of a box therefrom, mechanism for delivering components of a box to said form block at the beginning of each cycle, and members moved out of the path of delivery of said components as said form block approaches the receiving position therefor, movable to register the delivered components with the form block, and movable with the form block for part of the cycle to hold the components in registered position thereon.

45. A machine for forming composite boxes comprising a form block, means for feeding strips of box material adjacent said form block, knife structure for cutting said strips to form components of a box, means for delivering the components to the form block at the beginning of a box-forming cycle, and means for varying the size of said components comprising means for varying the portion of the cycle for which said strip feeding means is operative and for varying the position of said knife structure.

ERNEST G. RIDER.